US00RE47861E

(19) United States
(12) Reissued Patent
Lev

(10) Patent Number: US RE47,861 E
(45) Date of Reissued Patent: Feb. 18, 2020

(54) SHOWERHEAD SYSTEM WITH FRONT OR SIDE MOUNTED DIVERTER CONTROL INTERFACE

(71) Applicant: SIDUS TECHNOLOGIES, INC., West Bloomfield, MI (US)

(72) Inventor: Mordechai Lev, West Bloomfield, MI (US)

(73) Assignee: Sidus Technologies Inc., West Bloomfield, MI (US)

(21) Appl. No.: 15/719,677

(22) Filed: Sep. 29, 2017

Related U.S. Patent Documents

Reissue of:
(64) Patent No.: 9,149,817
Issued: Oct. 6, 2015
Appl. No.: 14/011,209
Filed: Aug. 27, 2013

U.S. Applications:
(60) Provisional application No. 61/693,549, filed on Aug. 27, 2012.

(51) Int. Cl.
*B05B 1/18* (2006.01)
*E03C 1/04* (2006.01)
*B05B 1/16* (2006.01)

(52) U.S. Cl.
CPC ..... *B05B 1/185* (2013.01); *E03C 1/0408* (2013.01); *E03C 1/0409* (2013.01); *B05B 1/1627* (2013.01); *B05B 1/18* (2013.01)

(58) Field of Classification Search
CPC ..... E03C 1/0408; E03C 1/0409; B05B 1/185
See application file for complete search history.

(56) References Cited

U.S. PATENT DOCUMENTS

| | | | | |
|---|---|---|---|---|
| 3,471,872 | A | 10/1969 | Symmons | |
| 3,722,800 | A * | 3/1973 | Shames | B05B 1/185 239/447 |
| 4,752,975 | A | 6/1988 | Yates | E03C 1/06 239/207 |
| 5,749,552 | A | 5/1998 | Fan | |
| 7,360,723 | B2 * | 4/2008 | Lev | B05B 1/16 239/442 |
| 7,937,784 | B2 * | 5/2011 | Qiu | B05B 1/1618 4/661 |
| 8,919,379 | B2 * | 12/2014 | Zhou | B05B 1/1618 137/625.48 |

FOREIGN PATENT DOCUMENTS

| | | | | |
|---|---|---|---|---|
| WO | WO2011088436 A * | 7/2011 | | E03C 1/0408 |
| WO | 2011110081 A1 | 9/2011 | | |
| WO | WO2011110081 * | 9/2011 | | E03C 1/16 |
| WO | WO2011110081 A1 * | 9/2011 | | B05B 1/1618 |

* cited by examiner

*Primary Examiner* — Sara S Clarke
(74) *Attorney, Agent, or Firm* — Blue Filament Law PLLC

(57) ABSTRACT

A shower fixture is provided that includes a fixed fluid dispensing unit and a removable fluid dispensing unit releasably secured to a receptacle therefor associated with the fixed dispensing unit such that the fixed dispensing unit and removable dispensing unit in a secured relationship form an integral dispensing face. A fluid supply provides selective communication with a front *or side* mounted diverter control interface for directing fluid flow to at least one of the fixed and removable fluid dispensing units.

29 Claims, 8 Drawing Sheets

SHOWERHEAD SYSTEM WITH FRONT OR SIDE MOUNTED DIVERTER CONTROL INTERFACE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application *is a reissue application of U.S. Pat. No. 9,149,817 B2, issued from U.S. application Ser. No. 14/011, 209, filed on Aug. 27, 2013, which* claims priority of U.S. Provisional Patent Application Ser. No. 61/693,549 filed Aug. 27, 2012, which is incorporated herein by reference.

FIELD OF INVENTION

The present invention generally relates to showerheads; and more specifically, the present invention relates to a showerhead incorporating a detachable handle and spray head with a diverter control interface for directing fluid flow positioned on the front *or side* of the showerhead.

BACKGROUND OF THE INVENTION

The prior art is well documented with various examples of showerhead attachments and assemblies. In each instance, such showerhead devices provide either or both of a steady stream flow or pulse flow of water to a user, and such as within a shower or tub enclosure. In certain instances, the assembly may be subdivided into more than one water dispensing head, such often including a fixed showerhead and a movable showerhead fluidly related in some fashion to the fixed showerhead.

A first example drawn from the prior art is set forth in U.S. Pat. No. 4,752,975, issued to Yates, and which teaches a showerhead assembly including a diverter valve for diverting a water supply to one of two showerheads. One of the showerheads is generally laterally and adjustably displaced from the other of the showerheads by means of a swivelable extension arm and the entire assembly is easily installable on the existing overhead water supply line of a shower stall or bath enclosure.

U.S. Pat. No. 5,749,552, issued to Fan, teaches a mounting assembly for mounting a bracket for attaching a handheld showerhead in relation to a wall of a bathroom. The mounting assembly includes a fitting having an end for connecting with a fixed spray head, another end for connecting a water supply pipe and an extending portion for threadably engaging a top end of a post on which the bracket can be slidably locked therealong. A bottom end of the post is attached with a vacuum mounting assembly for mounting the bottom end of the post on the wall by a vacuum pressure.

Finally, U.S. Pat. No. 3,471,872, issued to Symmons, teaches a plumbing fixture for baths which facilitates provision of a handheld spray unit in a bathtub or shower installation. A casing incorporates a diverter valve assembly and an ornamental housing which conceals the casing and is adapted to function as a tub spout or as a showerhead support.

In spite of the prior art efforts, there remains a need for a showerhead incorporating a detachable handle and spray head with a diverter control interface for directing fluid flow that is easy to use and reach especially for elderly, shorter people, and children. Such a showerhead would provide flexibility in the water stream characteristics and the shower experience.

SUMMARY OF THE INVENTION

A shower fixture is provided that includes a fixed fluid dispensing unit and a removable fluid dispensing unit releasably secured to a receptacle therefor associated with the fixed dispensing unit such that the fixed dispensing unit and removable dispensing unit in a secured relationship form an integral dispensing face. A fluid supply provides selective communication with a front *or side* mounted diverter control interface for directing fluid flow to at least one of the fixed and removable fluid dispensing units.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings wherein like reference numerals refer to like parts throughout the several views, and in which:

The detailed description explains the preferred embodiments of the invention

DESCRIPTION OF THE INVENTION

The present invention has utility as a hygienic shower fixture. An inventive showerhead system includes a fixed fluid dispensing unit and a removable fluid dispensing unit releasably secured to a receptacle therefor associated with the fixed dispensing unit such that the fixed dispensing unit and removable dispensing unit in a secured relationship form an integral dispensing face. A fluid supply provides selective communication with a front *or side* mounted diverter control interface for directing fluid flow to at least one of the fixed and removable fluid dispensing units.

Figure 1B:
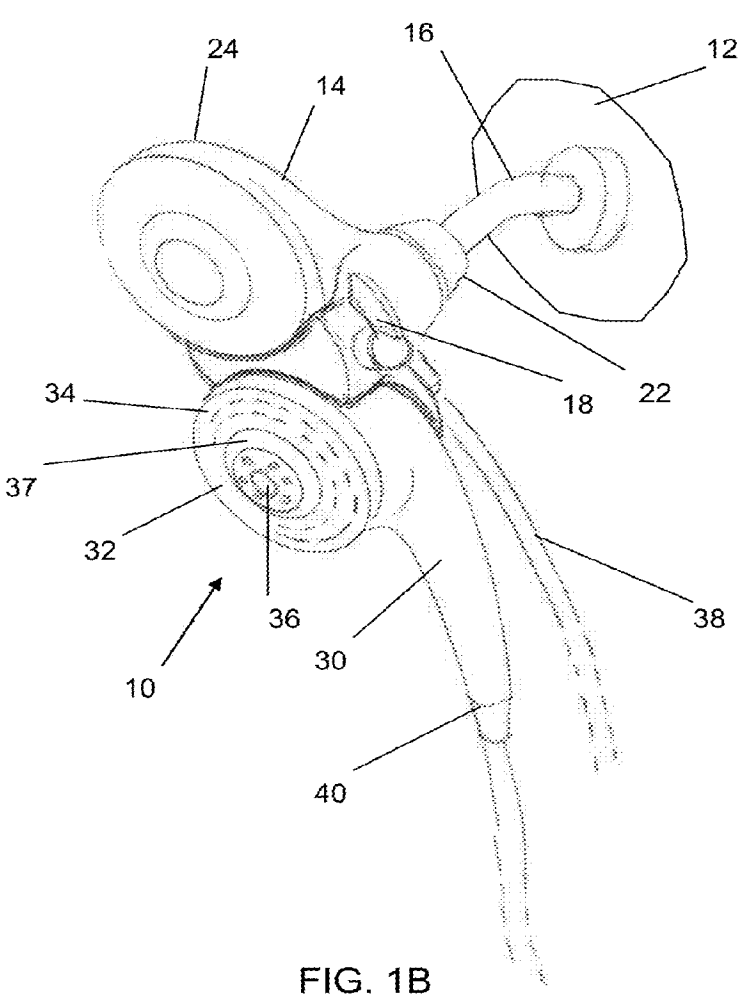
FIGS. 1A and 1B are perspective views of a showerhead assembly having a removable unit with a [front] *side* mounted diverter control interface for directing fluid flow according to an embodiment of the present invention.
Figure 1A:
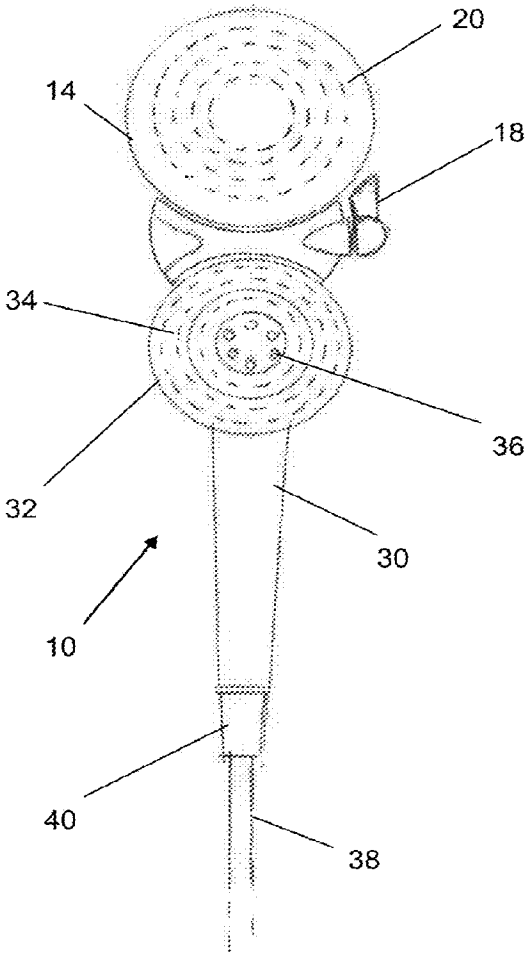

Referring to FIGS. 1A and 1B, an illustration is shown at 10 of a showerhead assembly and such as which is mounted to a fixed vertical location 12, such as which is typically associated with a shower enclosure or wall surface associated with a bathtub. As previously described, the present invention provides the user with a traditional showerhead experience, in addition to the option of removing and manipulating a removable shower handle 30 incorporated into the showerhead. According to the present invention, and as will be further described, the handle 30 optionally functions independently from the head as a water source, or in combination therewith, for the handle and showerhead in their assembled position and dissociated positions, respectively.

Referring again to FIGS. 1A and 1B, the showerhead system includes a fixed fluid dispensing unit 14 which is supported at a location 12. The location 12 illustratively includes a vertical or wall surface, or a Roman tub edge. The fixed dispensing unit 14 includes an inlet end 16, such further including an internal passageway for communicating a fluid flow, such as originating from a pipe or tubing extending in communication with the inlet end.

A fluid diverter element 18, such as a valve, "T" connector or other suitable directional flow control element, lever, or knob, is located in fluid communication with the inlet fluid supply and a flow outlet associated with the fixed dispensing element 14. As will be farther described, the fluid diverter 18 facilitates selective or combined fluid flow to either or both of fixed and removable fluid dispensing units associated with the showerhead system 10. The fluid diverter 18 in the form of a [front] *side* mounted diverter control interface provides an easy to use and reach control especially for elderly, shorter people, and children.

A plurality of fluid dispensing nozzles 20 are formed along a face of the fixed dispensing unit 14 and are further understood to be provided in either a contiguous or non-contiguous array pattern. It is further understood and envisioned that the dispensing nozzles 20 are optionally formed in any desired pattern or arrangement, and can also be provided in different sizes and spray dispersion patterns within the skill of one in the ordinary art.

The head of the fixed dispensing unit 14 in certain inventive embodiments further repositioned by virtue of an articulating joint 22 located intermediate between the fluid supply inlet 16 and the array of dispensing nozzles 20. The articulating joint 22 is appreciated to be any conventional adjustment mechanism known to the art, such as a ball joint type or other means of adjustment that affords the ability to tilt and/or rotate the inventive showerhead.

A gripping location, see rear edge 24, facilitates repositioning of the head associated with the fixed unit 14 and about the articulated joint 22. It is also appreciated that a variety of head configurations are operative in the present invention, these configurations illustratively including multiple nozzles in one contiguous pattern such as a ring, arc, rail and a parabola; and a single nozzle forming a circular or linear opening to create a spray or waterfall-type discharge.

Figure 2B:
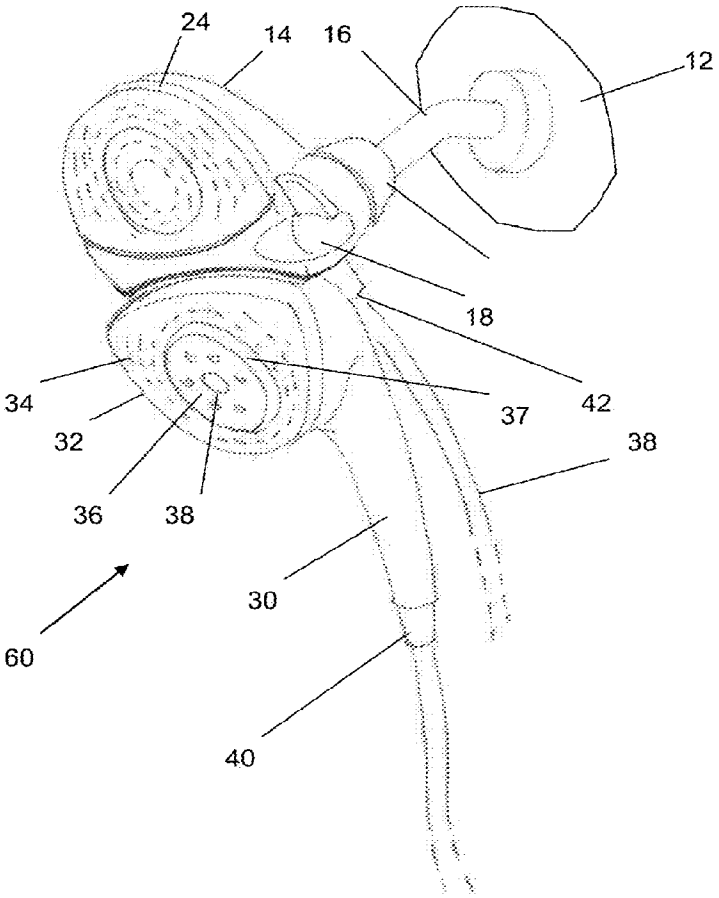
FIGS. 2A-2C are perspective views of a showerhead assembly having a similar configuration to the showerhead of FIGS. 1A and 1B according to an embodiment of the present invention.
Figure 2A:
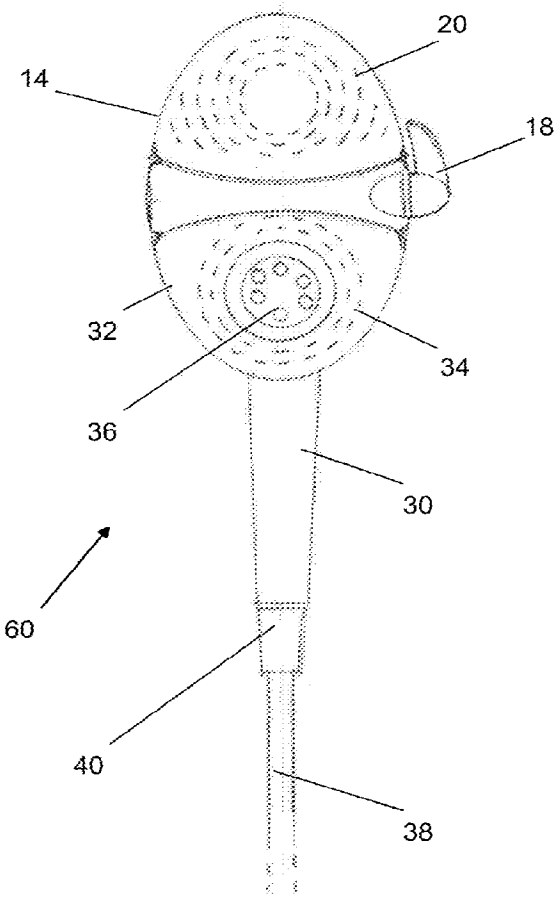
Figure 2C:
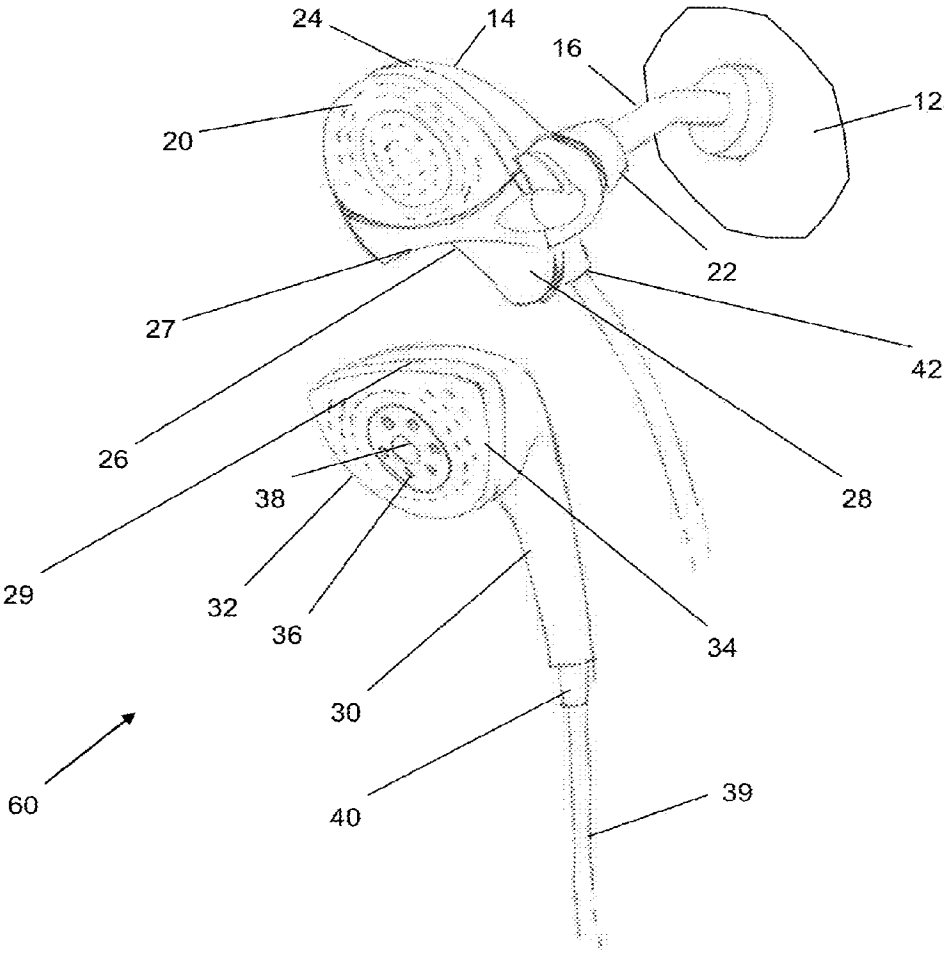

As is best illustrated in the exploded view of FIG. 2C, where FIGS. 2A-2C are perspective views of an inventive showerhead assembly with an alternate configuration is shown generally at 60 where like numerals correspond to those previously described with respect to preceding Figures, a receptacle is formed within the fluid dispensing head associated with the fixed unit and is illustrated by recessed side 26 and base surface 28. In certain inventive embodiments, the receptacle surfaces are formed along an axial centerline associated with the fixed dispensing head; however it is understood that the receptacle may also be formed in a side-by-side arrangement or other asymmetric fashion relative to the fixed head.

Referring again to FIGS. 1 and 2, a removable fluid dispensing unit is illustrated at 30 and, as best again illustrated in FIG. 2C, includes a body exhibiting a backside configuration, and such that it may be mechanically and releasably secured within the side 26 and base recessed surface 28 formed in the fixed dispensing unit 14. As again is best shown in FIG. 2C, an apertured cutout, see inner walls 27, is formed in the fixed dispensing unit 14 and seats an associated outer perimeter 29 of the removable dispensing unit 32 upon the same being mounted within the recessed side 26 and base surface 28 of the fixed head.

It is further appreciated that a retaining portion in certain inventive embodiments is integrated into the removable dispensing unit 32 or, alternatively, represents complementary securing components that attach to a handle and/or showerhead of an inventive system. It is also envisioned and understood that the removable fluid dispensing unit 32 may be secured to the fixed unit 14 such as through the use of Velcro® (hook and loop) portions, spring-loaded retainer pins that release in response to a push button (not shown), cradles, or other securements consistent with the forces and humidity associated with the showerhead use environment. In another inventive embodiment, depression of the button retracts the pin (not shown) allowing for detachment of the removable unit 32. Replacement of the removable unit 32 depresses the pin which again seats within a complementary indentation (not shown) in the handle 30. It is appreciated that alternate modes of retaining a removable portion in selective engagement with the fixed portion are known to the art and illustratively include a hinge-pin, male-female, luer, and bayonet fittings.

The removable unit 32 includes at least one plurality of fluid dispensing nozzles and, in a preferred embodiment, may include a first array of nozzles 34 formed in a planar extending face associated with the removable unit. The array of nozzles 34 are similar to the nozzles 20 which are formed across the face of the fixed unit 14. In certain inventive embodiments, a second array of fluid dispensing nozzles 36 are provided. In still other inventive embodiments, a centrally located nozzle 38 is provided relative to the circular nozzle array 36. Each nozzle array 36 and 38 being established in preferably a non-contiguous pattern and providing a different shape and configuration in order to provide multiple spray function modes associated with the removable fluid dispensing unit illustratively including a variable spray or pulse pattern. A removable unit mode control dial 37 affords mode control for the removable unit 32.

As is again best illustrated with reference to FIG. 2C, the removable fluid dispensing unit 32 is connected to the water supply through a conduit 39, such as a hose, or other means of conducting the water. One end of the hose 40 is connected to the removable unit 30 and an opposite end 42 is connected to the diverter or T connection 18. As previously described, the head associated with the fixed dispensing unit 14 in certain inventive embodiments is connected to the water supply and/or to the inlet 16 through the diverter 18 and it is contemplated that the diverter valve may include up to three flow adjustment positions to facilitate selective or combined fluid flow through the fixed and/or removable dispensing units. In case of a T connection type with no diverting feature, the water is supplied to the removable and fixed dispensing units at all times. As noted the fluid diverter 18 in the form of a [front] *side* mounted diverter control interface provides an easy to use and reach control especially for elderly, shorter people, and children.

Figure 3:
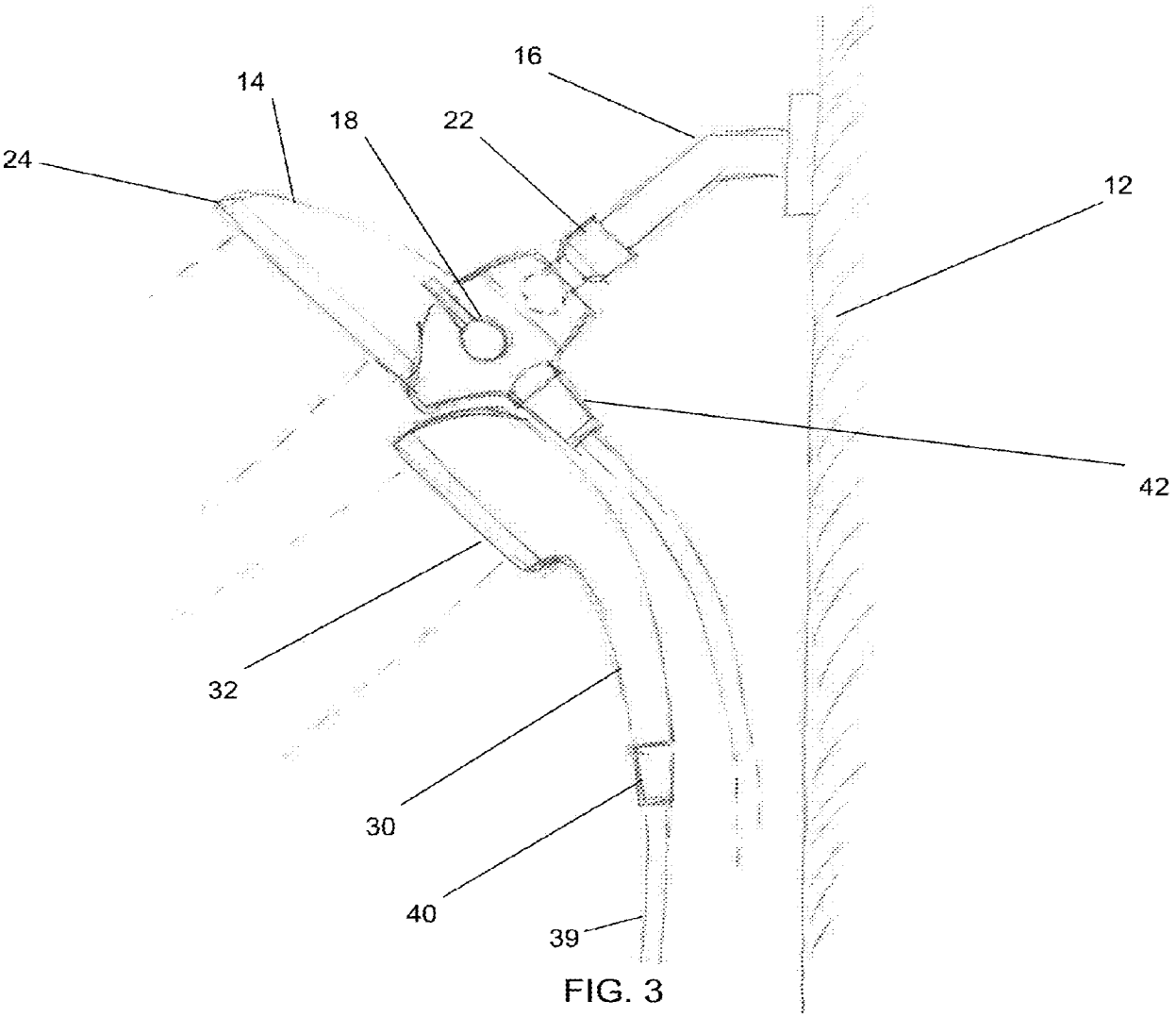
FIG. 3 is a side perspective view of the showerhead assemblies of FIGS. 1 and 2.

FIG. 3 is a side perspective view of the embodiments of the showerhead assemblies of FIGS. 1 and 2 that illustrates the removable unit 32 joined to the face of the fixed unit 14.

Figure 4:
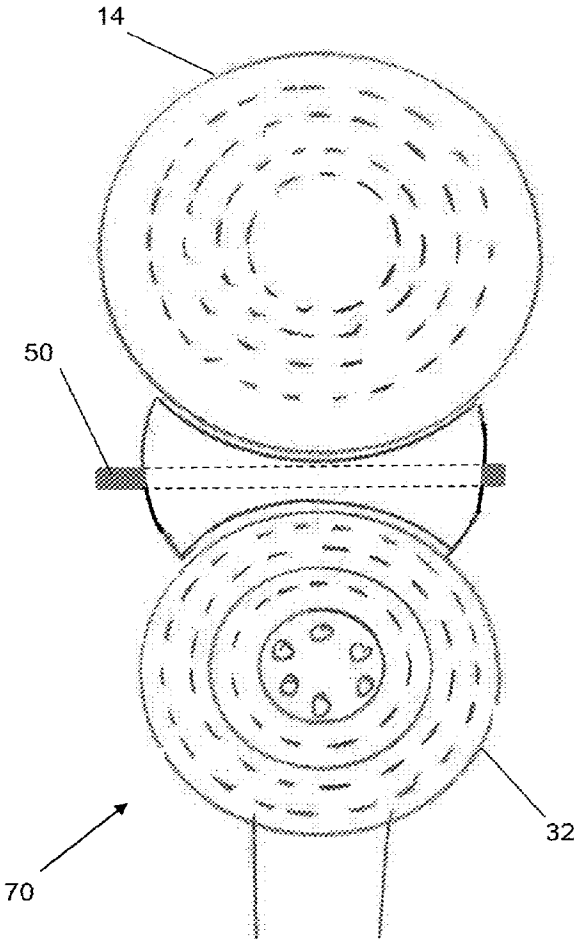
FIG. 4 is a front perspective view of a push pin diverter control according to an embodiment of the invention.

FIG. 4 is a front perspective view of a push pin diverter control 50 according to an embodiment of the invention. The push pin diverter control 50 facilitates selective or combined fluid flow to either or both of fixed and removable fluid dispensing units associated with the showerhead system 70. The push pin diverter control 50 in the form of a [front] *side* mounted diverter control interface provides an easy to use and reach control especially for elderly, shorter people, and children. In the embodiment shown, the push pin diverter control 50 is pressed all the way to the left and only provides water to the fixed unit 14. In the event the push pin diverter control 50 is pressed all the way to the right, water is only supplied to the removable unit 32. When the push pin diverter control 50 is in a middle position, water is supplied to both fixed unit 14 and the removable unit 32. It is noted that in other embodiments the positioning of the push pin diverter may result in different fluid flow assignments. *The push pin diverter control 50 is shown intermediate between the fixed unit 14 and the removable unit 32.*

Figure 5:
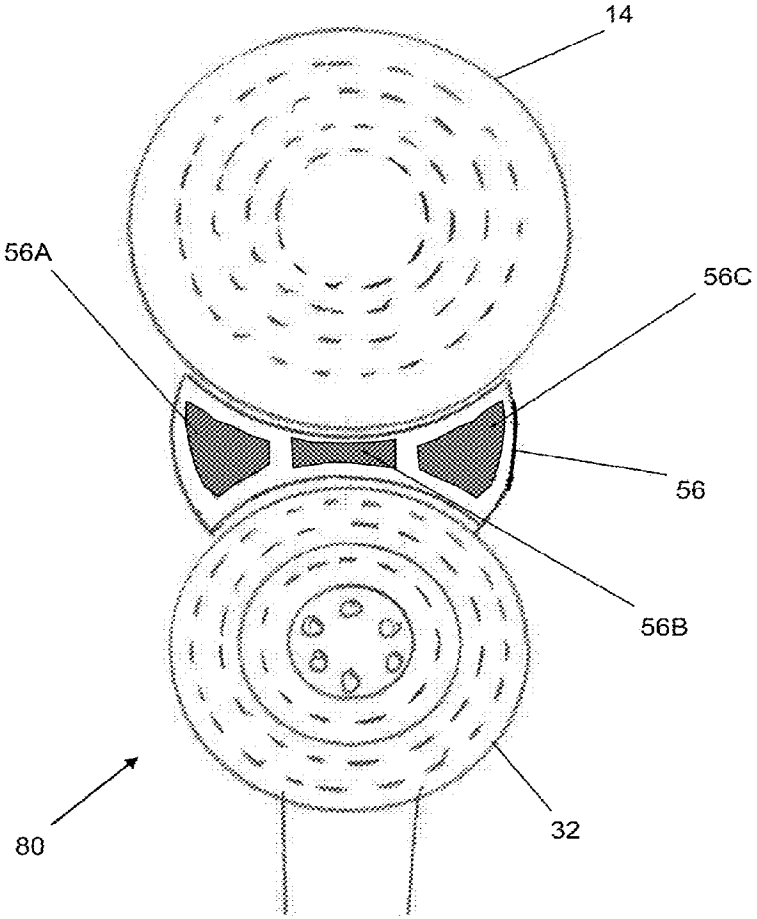
FIG. 5 is a front perspective view of a push button interface for diverter control according to an embodiment of the invention.

FIG. 5 is a front perspective view of a push [button interface] *pin diverter control* 56 for diverter control according to an embodiment of the invention. The push button diverter control 56 facilitates selective or combined fluid flow to either or both of fixed and removable fluid dispensing units associated with the showerhead system 80. The push [button] *pin* diverter control 56 in the form of a front mounted diverter control interface provides an easy to use and reach control especially for elderly, shorter people, and children. In the embodiment shown, the push pin diverter control 56 has three separate buttons 56A, 56B, and 56C for controlling fluid flow. When left button 56A is pressed water is exclusively supplied to the fixed unit 14. In the event the right button 56C is pressed, water is only supplied to the removable unit 32. When the middle button 56B is depressed, water is supplied to both fixed unit 14 and the removable unit 32. It is noted that in other embodiments the push buttons 56 may result in different fluid flow assignments.

Figure 6C:
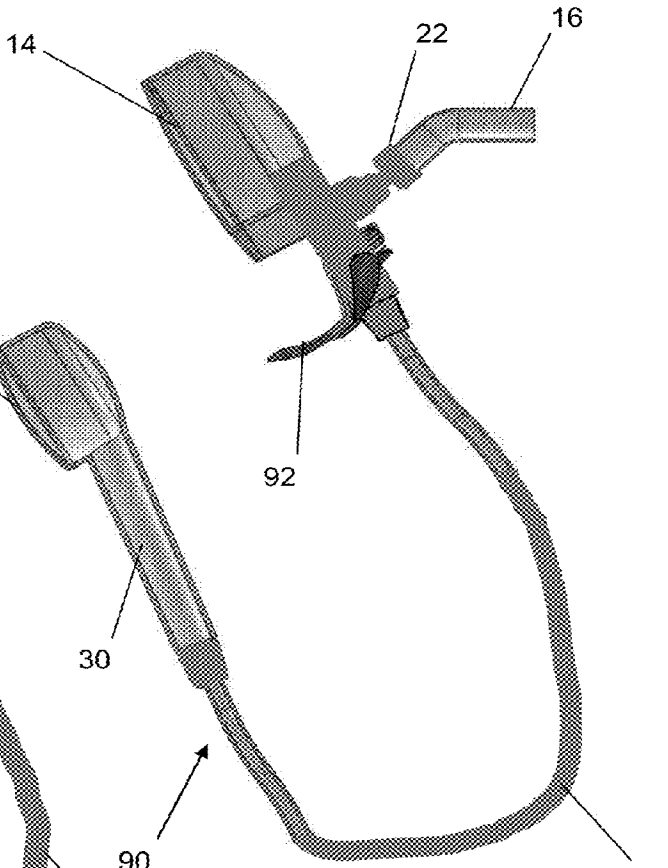
FIG. 6C is a side perspective view of the showerhead assembly with the removable dispensing unit removed from the holding cradle of the fixed dispensing unit according to an embodiment of the present invention.
Figure 6B:
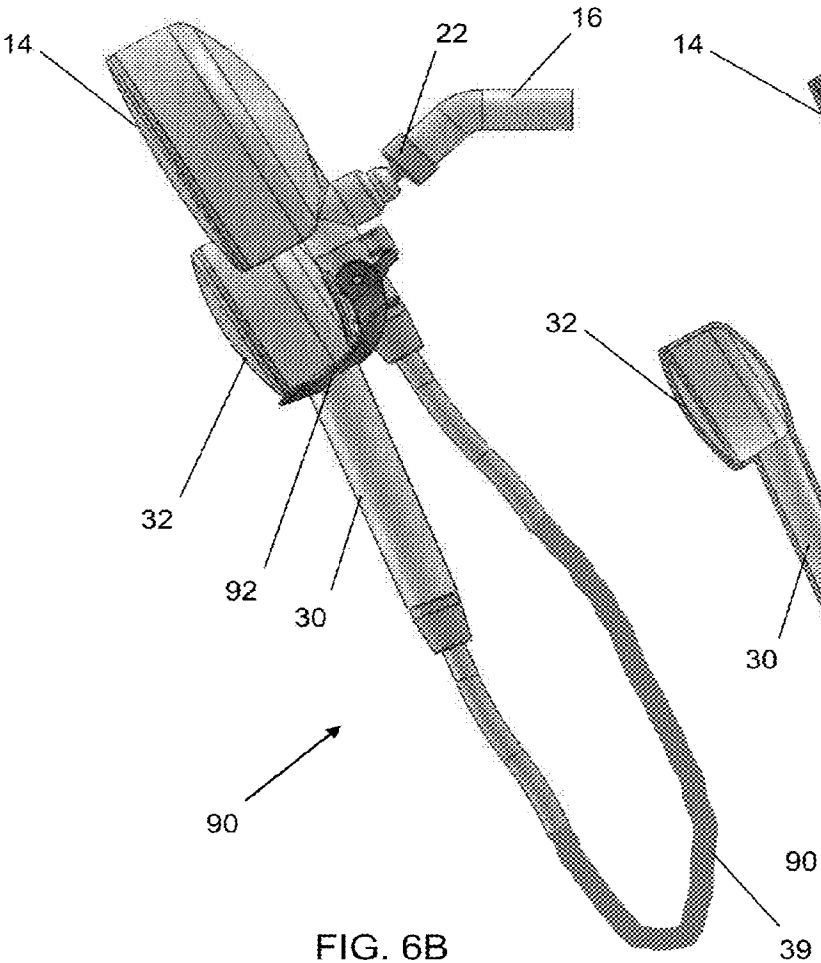
FIGS. 6A and 6B are front and side perspective views of a showerhead assembly having a removable unit with an automatic diverter for directing fluid flow according to an embodiment of the present invention.
Figure 6A:
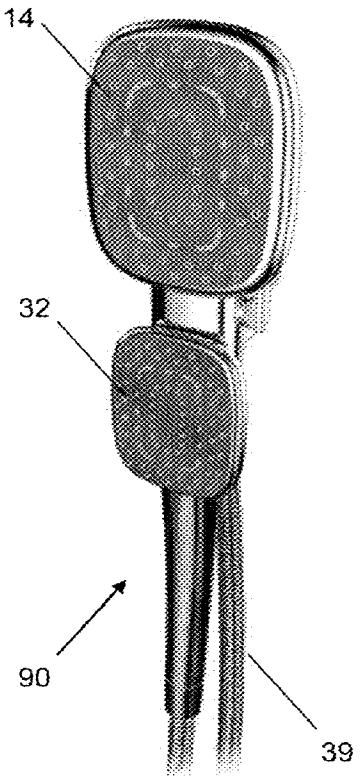

FIGS. 6A and 6B are front and side perspective views of a showerhead system 90, respectively according to an embodiment of the invention. As shown in FIGS. 6A and 6B a fixed unit 14 supports a removable unit 32, where the removable unit is placed in and supported by a holster or cradle 92. FIG. 6C shows the removable unit 32 removed from the cradle 92. The cradle 92 actuates a fluid control mechanism/diverter contained within the fixed unit 14 for controlling the fluid flow between the fixed unit 14 and removable unit 32. In certain inventive embodiments the percentage or ratio of fluid that is discharged between the fixed unit 14 and removable unit 14 is user selectable, where the fixed unit 14 may have from 100 to 0 percent of the fluid flow, and the removable unit 32 may have 0 to 100 percent of the fluid flow. In certain inventive embodiments when the removable unit 32 is outside the cradle 92 all of the fluid is diverted to the removable unit 32.

Figure 6D:
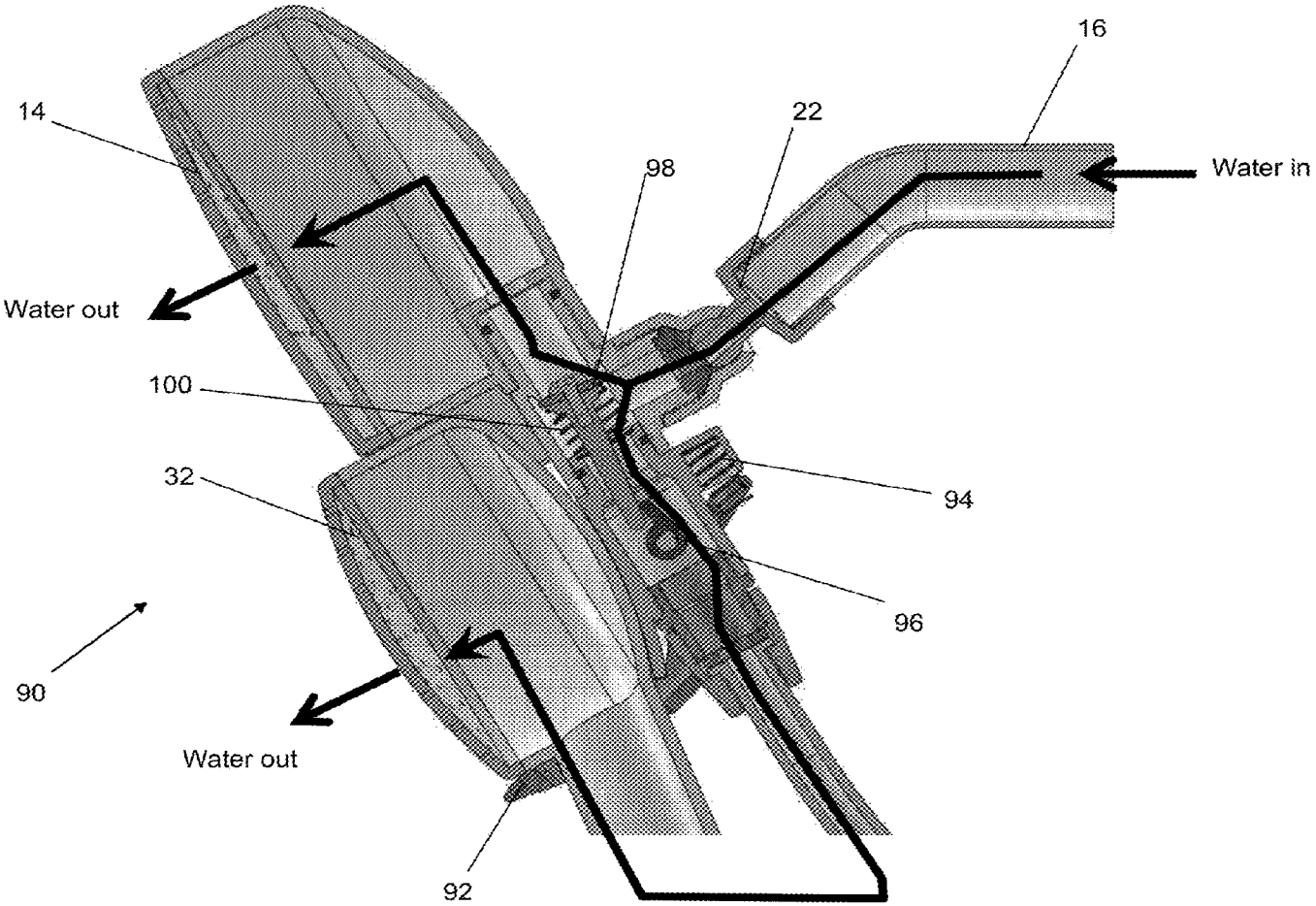
FIG. 6D is a cross sectioned view of FIG. 6B illustrating the diverter mechanism and fluid flow with the removable dispensing unit within the holding cradle of the fixed dispensing unit according to an embodiment of the present invention.

FIG. 6D is a cross-sectional view illustrating the fluid control mechanism/diverter within the fixed unit 14 and the removable unit 32 resting in the cradle 14. With the removable unit 32 resting in the cradle 92, the downward bias of spring 94 is overcome, and the trigger 96 pushes on the bottom portion of the check or T valve 98 that pivots on valve spring 100, and opens the T valve 98 so that fluid may flow to the fixed unit 14, as well as the removable unit 32.

Figure 6E:
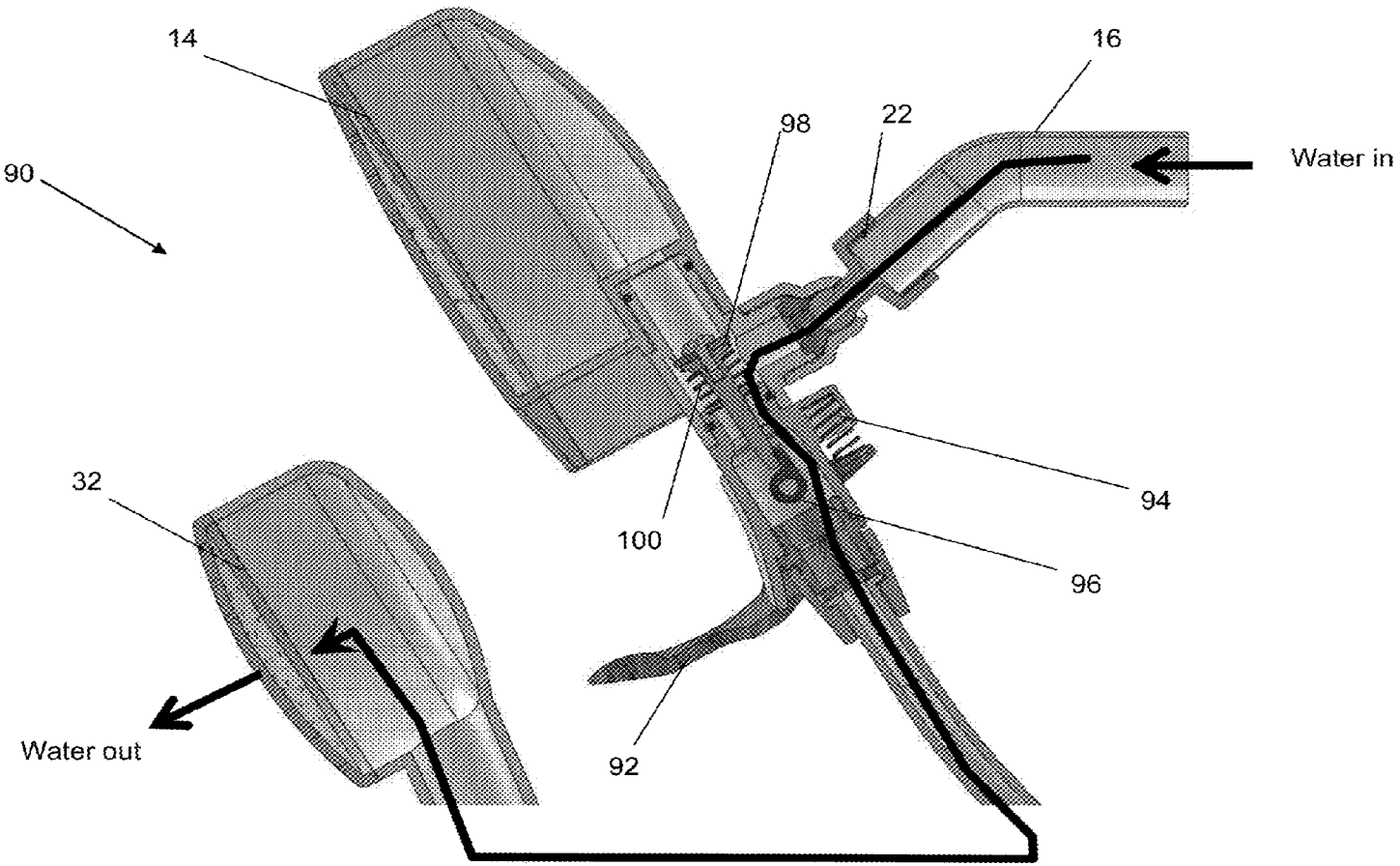
FIG. 6E is a cross sectioned view of FIG. 6C illustrating the diverter mechanism and fluid flow with the removable dispensing unit removed from the holding cradle of the fixed dispensing unit according to an embodiment of the present invention.

FIG. 6E is a cross-sectional view illustrating the fluid control mechanism/diverter within the fixed unit 14 with the removable unit 32 removed from the cradle 14. With the removable unit 32 removed from the cradle 92, the downward bias of spring 94 releases the trigger 96, and the trigger 96 no longer pushes on the bottom portion of the T valve 98, and the valve spring 100 provides a bias that closes the T valve 98 so that fluid may no longer flow to the fixed unit 14, and all fluid flow is diverted to the removable unit 32.

Thus the placement of the removable unit 32 with respect to the cradle 92 automatically selects the direction in which water will be diverted based on the following:

when the handle 30 of the removable dispensing unit 32 is placed in the cradled 92 of the fixed dispensing unit 14, the fluid control mechanism/diverter automatically diverts the water to both the removable dispensing unit 32 and fixed dispensing unit 14; and when the removable dispensing unit 32 is removed from the cradle 92, the fluid control mechanism/diverter automatically diverts 100% of the water to the removable dispensing unit 32.

The foregoing description is illustrative of particular embodiments of the invention, but is not meant to be a limitation upon the practice thereof. The following claims, including all equivalents thereof, are intended to define the scope of the invention.

The invention claimed is:

1. A showerhead system for communicating a fluid supply, said showerhead system comprising:

a fixed fluid dispensing unit supported at a location, said fixed dispensing unit comprising a plurality of nozzles in fluid communication with the fluid supply;

a removable fluid dispensing unit releasable secured to a cradle receptacle established with said fixed dispensing unit forming an integral dispensing face with said fixed dispensing unit and comprising at least one additional plurality of nozzles being connected to a hose in fluid communication with the fluid supply when said removable fluid dispensing unit is dissociated from said fixed fluid dispensing unit;

a fluid inlet associated with said fixed dispensing unit, a fluid diverter fluidly communicating said fluid supply with at least one of said fixed and removable dispensing units;

wherein said fluid diverter is actuated by said cradle receptacle; and wherein when said removable dispensing unit is resting in said cradle, fluid flow is available to both said fixed dispensing unit and said removable dispensing unit.

2. The showerhead system as described in claim 1, wherein the ratio of fluid flow available to each of said fixed dispensing unit and said removable dispensing unit is determined by a user.

3. The showerhead system as described in claim 1, wherein when said removable dispensing unit is removed from said cradle, fluid flow is only available to said removable dispensing unit.

4. A showerhead system for communicating a fluid supply, said showerhead system comprising:

a fixed fluid dispensing unit supported at a location, said fixed dispensing unit comprising a plurality of nozzles in fluid communication with the fluid supply;

a removable fluid dispensing unit releasably secured to a cradle receptacle established with said fixed dispensing unit forming an integral dispensing face with said fixed dispensing unit and comprising at least one additional plurality of nozzles being connected to a hose in fluid communication with the fluid supply when said removable fluid dispensing unit is dissociated from said fixed fluid dispensing unit;

a fluid inlet associated with said fixed dispensing unit, a fluid diverter fluidly communicating said fluid supply with at least one of said fixed and removable dispensing units; and wherein said fluid diverter is actuated by said cradle receptacle, where said fluid diverter further comprises a bias spring with a downward bias that is overcome when the removable unit is in said cradle, and a trigger in mechanical communication with said bias spring, said trigger configured to push on a bottom portion of a check or T valve that pivots on a valve spring, so that fluid is allowed to flow to said fixed unit, as well as said removable unit when said removable unit is in said cradle; and wherein when said removable unit is removed from said cradle, the downward bias of said bias spring releases said trigger, and said trigger no longer pushes on the bottom portion of said check or T valve, and said valve spring provides a bias that closes said check or T valve so that fluid no longer flows to the fixed unit, and all fluid flow is diverted to said removable unit.

5. The showerhead system as described in claim 1 further comprising a spring-loaded button controlling a locking pin, said locking pin engaging a complementary depression in said removable fluid dispensing unit.

6. The showerhead system as described in claim 1 wherein said fixed fluid dispensing unit further comprises at least one gripping location to permit readjustment of said fixed unit about an articulating joint.

7. The showerhead system as described in claim 1, wherein said removable dispensing unit has a plurality of spray function modes.

8. The showerhead system as described in claim 7 further comprising a mode control dial intermediate between the at least one additional nozzle of said removable fluid dispensing unit and the fluid supply.

9. The showerhead system as described in claim 8, further comprising at least one individual plurality of nozzles associated with a fluid dispensing surface of said removable unit.

10. The showerhead system as described in claim 4 further comprising a spring-loaded button controlling a locking pin, said locking pin engaging a complementary depression in said removable fluid dispensing unit.

11. The showerhead system as described in claim 4 wherein said fixed fluid dispensing unit further comprises at least one gripping location to permit readjustment of said fixed unit about an articulating joint.

12. The showerhead system as described in claim 4 wherein said removable dispensing unit has a plurality of spray function modes.

13. The showerhead system as described in claim 12 further comprising a mode control dial intermediate between the at least one additional nozzle of said removable fluid dispensing unit and the fluid supply.

14. The showerhead system as described in claim 13 further comprising at least one individual plurality of nozzles associated with a fluid dispensing surface of said removable unit.

*15. A showerhead system for communicating a fluid supply, said showerhead system comprising:*

*a fixed fluid dispensing unit supported at a location, said fixed dispensing unit comprising a plurality of nozzles in fluid communication with the fluid supply;*

*a removable fluid dispensing unit releasably secured to a cradle receptacle established with said fixed dispensing unit forming an integral dispensing face with said fixed dispensing unit and comprising at least one additional plurality of nozzles being connected to a hose in fluid communication with the fluid supply when said removable fluid dispensing unit is dissociated from said fixed fluid dispensing unit;*

*wherein the fluid supply is adapted to being in selective communication with at least one of said fixed and said removable fluid dispensing unit via a push pin diverter control, wherein said push pin diverter control is positioned intermediate between said fixed dispensing unit and said removable unit; and*

*wherein when said removable fluid dispensing unit is resting in said cradle, fluid flow is available to both said fixed fluid dispensing unit and said removable fluid dispensing unit.*

*16. The showerhead system as described in claim 15, wherein said push pin diverter control has a first position that only provides fluid supply to the fixed dispensing unit, a second position that only provides fluid supply to said removable dispensing unit, and a third position that provide fluid supply to both said fixed dispensing unit and said removable dispensing unit.*

*17. The showerhead system as described in claim 15, further comprising a removable unit mode control dial in said removable dispensing unit.*

*18. The showerhead system as described in claim 15 wherein said fixed fluid dispensing unit further comprises at least one gripping location to permit readjustment of said fixed unit about an articulating joint.*

*19. The showerhead system as described in claim 15, wherein said removable fluid dispensing unit has a plurality of spray function modes.*

*20. A showerhead system for communicating a fluid supply, said showerhead system comprising:*

*a fixed fluid dispensing unit supported at a location, said fixed dispensing unit comprising a plurality of nozzles in fluid communication with the fluid supply;*

*a removable fluid dispensing unit releasably secured to a cradle receptacle established with said fixed dispensing unit forming an integral dispensing face with said fixed dispensing unit and comprising at least one additional plurality of nozzles being connected to a hose in fluid communication with the fluid supply when said removable fluid dispensing unit is dissociated from said fixed fluid dispensing unit;*

*wherein the fluid supply is adapted to being in selective communication with at least one of said fixed and said removable fluid dispensing unit via a lever diverter control, wherein said lever diverter control is positioned intermediate between said fixed dispensing unit and said removable unit; and*

*wherein when said removable fluid dispensing unit is resting in said cradle, fluid flow is available to both said fixed fluid dispensing unit and said removable fluid dispensing unit.*

*21. The showerhead system as described in claim 20, wherein said lever diverter control has a first position only provides fluid supply to the fixed fluid dispensing unit, a second position that only provides fluid supply to said removable fluid dispensing unit, and a third position that provides fluid supply to both said fixed fluid dispensing unit and said removable fluid dispensing unit.*

*22. The showerhead system as described in claim 20, further comprising a removable unit mode control dial in said removable fluid dispensing unit.*

*23. The showerhead system as described in claim 20 wherein said fixed fluid dispensing unit further comprises at least one gripping location to permit readjustment of said fixed unit about an articulating joint.*

*24. The showerhead system as described in claim 20, wherein said removable fluid dispensing unit has a plurality of spray function modes.*

*25. A showerhead system for communicating a fluid supply, said showerhead system comprising:*

*a fixed fluid dispensing unit supported at a location, said fixed dispensing unit comprising a plurality of nozzles in fluid communication with the fluid supply;*

*a removable fluid dispensing unit releasably secured to a cradle receptacle established with said fixed dispensing unit forming an integral dispensing face with said fixed dispensing unit and comprising at least one additional plurality of nozzles being connected to a hose in fluid communication with the fluid supply when said removable fluid dispensing unit is dissociated from said fixed fluid dispensing unit;*

*wherein the fluid supply is adapted to being in selective communication with at least one of said fixed and said removable fluid dispensing unit via a push button diverter control, wherein said push button diverter control is positioned intermediate between said fixed dispensing unit and said removable unit; and*

*wherein when said removable fluid dispensing unit is resting in said cradle, fluid flow is available to both said fixed fluid dispensing unit and said removable fluid dispensing unit.*

*26. The showerhead system as described in claim 25, wherein said push button diverter control comprises a first push button that when activated only provides fluid supply to the fixed fluid dispensing unit, a second push button that when activated only provides fluid supply to said removable fluid dispensing unit, and a third push button that when activated provides fluid supply to both said fixed fluid dispensing unit and said removable fluid dispensing unit.*

*27. The showerhead system as described in claim 25, further comprising a removable unit mode control dial in said removable fluid dispensing unit.*

*28. The showerhead system as described in claim 25 wherein said fixed fluid dispensing unit further comprises at least one gripping location to permit readjustment of said fixed unit about an articulating joint.*

*29. The showerhead system as described in claim 25, wherein said removable fluid dispensing unit has a plurality of spray function modes.*

* * * * *